Feb. 7, 1933.  W. S. HAYFORD ET AL  1,896,512
METAL ROLLING TOOL
Filed May 2, 1930   2 Sheets-Sheet 1
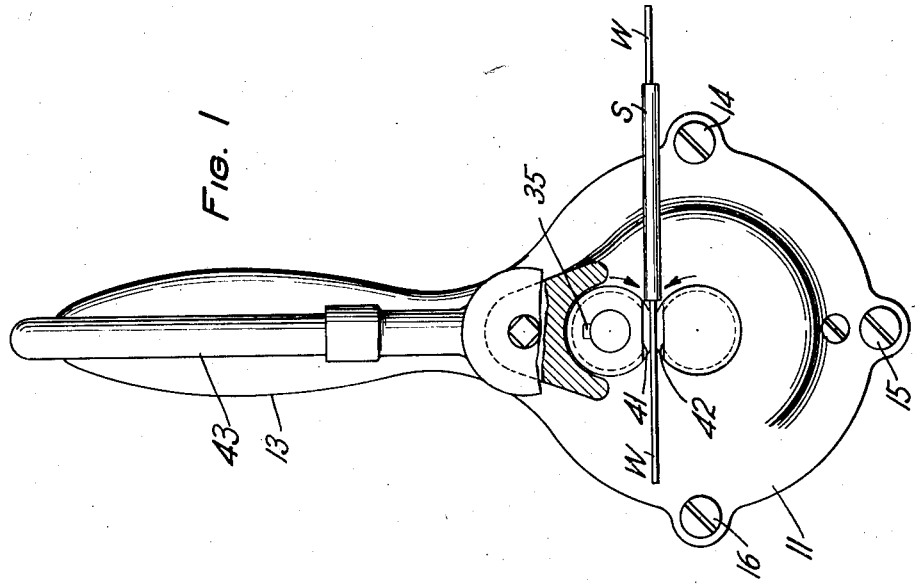
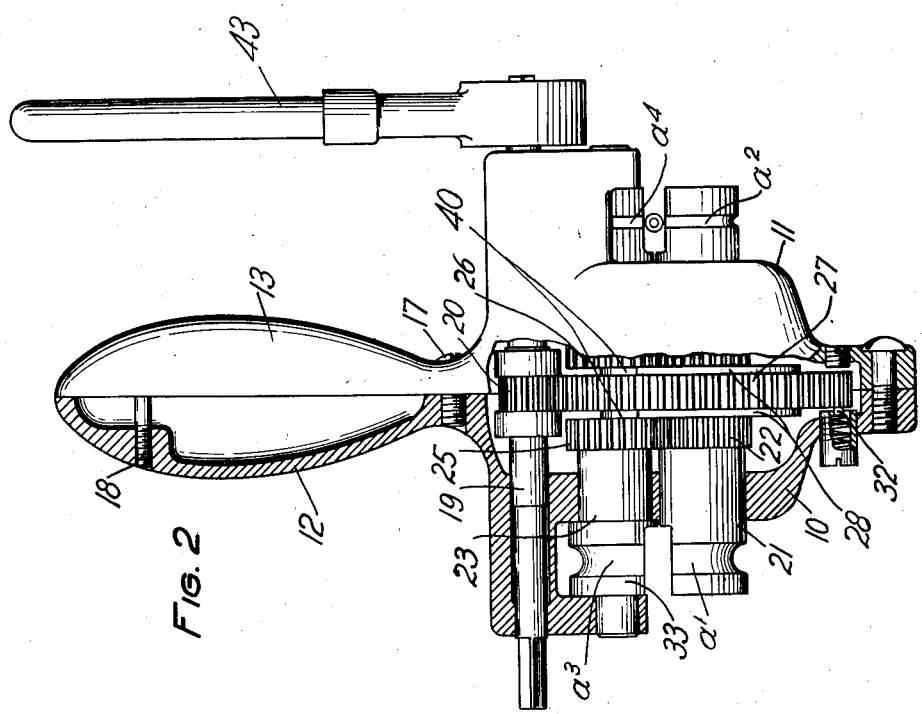
INVENTORS W. S. HAYFORD
C. R. MOORE
BY J. MacDonald
ATTORNEY

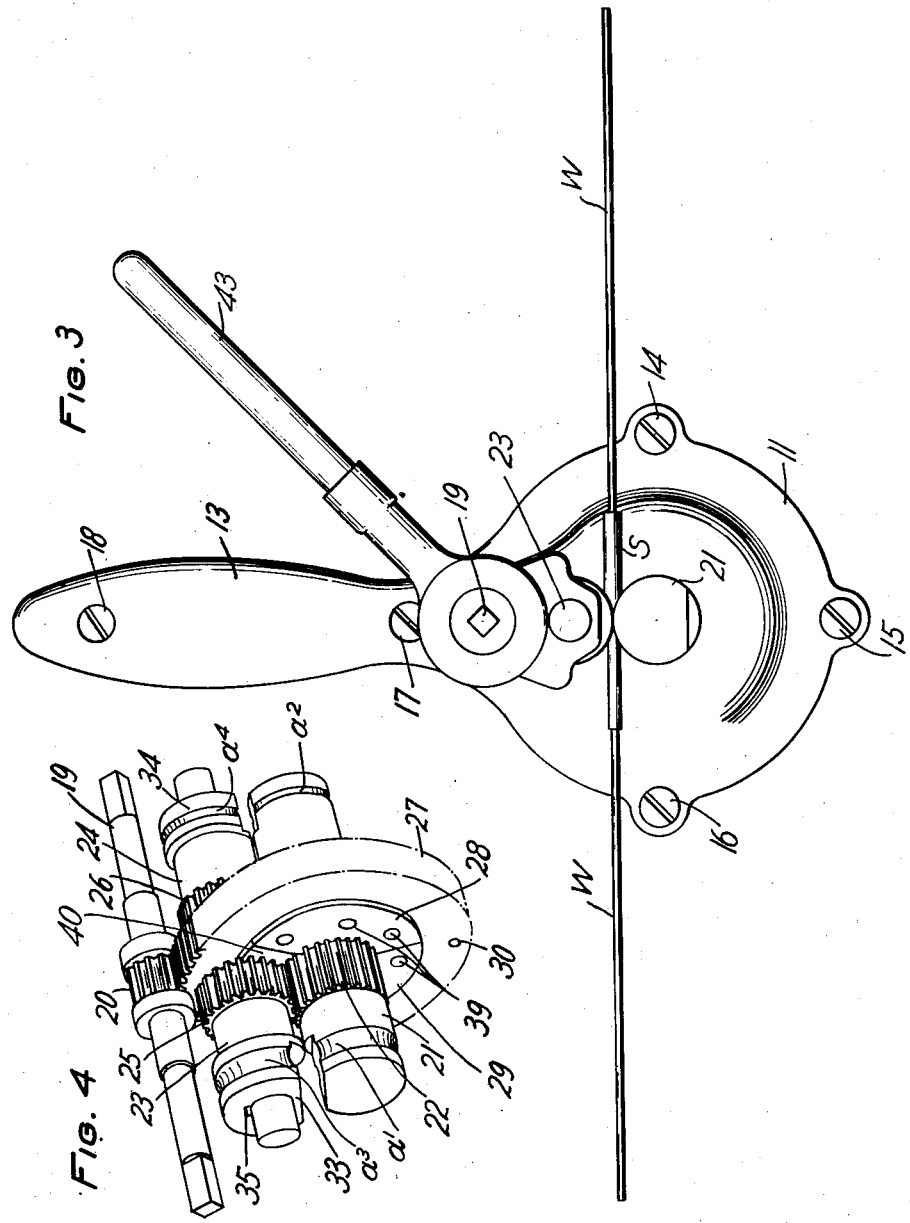

Patented Feb. 7, 1933

1,896,512

UNITED STATES PATENT OFFICE

WALTER S. HAYFORD, OF MORRISTOWN, AND CHARLES R. MOORE, OF MAPLEWOOD, NEW JERSEY, ASSIGNORS, BY MESNE ASSIGNMENTS, TO WESTERN ELECTRIC COMPANY, INCORPORATED, A CORPORATION OF NEW YORK

METAL-ROLLING TOOL

Application filed May 2, 1930. Serial No. 449,132.

This invention relates to metal rolling tools.

It has been found that a satisfactory joint for telegraph and telephone wires etc., can be made by rolling a soft metal sleeve into intimate contact with the abutting ends of wires which are to be joined.

According to the present invention a metal rolling tool for use in making joints in wire by rolling the metal sleeve over abutting ends thereof is provided which is adapted to be held in one hand and actuated by the manual operation of a handle lever with the other hand.

A rolling tool constructed according to this invention may comprise, for example, a driving shaft on which an operating handle lever is mounted, a counter shaft and two spindles with pairs of rollers mounted on or formed integrally with the counter shaft for the rolling of sleeves of different diameters and cooperating rollers mounted on or formed at one end of each of the spindles. A gear reduction mechanism operatively connects the driving shaft to the counter shaft and a second gear mechanism operatively connects the counter shaft with the spindles. The gears are preferably enclosed in a casing formed of two complementary portions having bearings provided for supporting the shafts and the spindles, these casing portions also having extensions, which, when the casing portions are united, form a handle for holding the tool in place on the wire upon the movement of the operating handle, and a detent device is mounted in one of the casing portions and cooperates with means carried by one of the gears for defining and yieldably holding the handle lever and the forming rollers actuated thereby in their starting position.

Other features and advantages of the invention will appear from the following description and by the claims appended thereto.

In the drawings,

Fig. 1 is a front view showing the forming rollers in normal non-operated position;

Fig. 2 is a side view thereof shown with the casing partially cut away;

Fig. 3 is an assembly view of the tool showing the forming rollers in the operated position on a sleeve and;

Fig. 4 is a perspective view of the gearing mechanism shown with the casing removed.

In the drawings 10 and 11 are support members which when assembled form a casing for a gear reduction mechanism shown in Figs. 2 and 4.

With each member 10 and 11 is cast integrally therewith an extending portion 12 and 13 of such shape as to form, when the support members 10 and 11 are assembled, a handle for the tool as shown in Figs. 1, 2 and 3. The casing portions 10 and 11 are held in assembled positions by screws 14, 15, 16 and 17 and a screw 18 at the extreme end portion of the handle thus formed.

On the supporting members 10 and 11 there is journaled a shaft 19 having a gear toothed portion 20 provided for a purpose that will be hereinafter described in detail.

On supporting members 10 and 11 there is journaled a shaft 21 which has a pinion 22 for imparting movement to two coaxially disposed spindles 23 and 24 through its engagement with the gears 25 and 26. Each of these spindles carries a forming roller 33 and 34 each having an annular grove $a^3$ and $a^4$ respectively.

The end portions of shaft 21 are formed with annular grooves $a^1$ and $a^2$ and cooperate with the grooves $a^3$ and $a^4$ in rollers 33 and 34 for rolling a sleeve on the wires in a manner that will be hereinafter described in detail. The shaft 21 is actuated through the movement of pinion 20 engaging a gear 27 which is held against movement on the shaft 21 by a number of internally gear toothed sectors, such as 28, 29 and 40 engaging the gear toothed portion 22. These gear sectors are held securely in position on each side of the gear 27 by a number of rivets such as 39 shown in Fig. 4. The gear 27 has on one side a circular recess 30 which cooperates with a spring pressed ball 32, shown in Fig. 2, for holding the shaft 21 and the forming rollers 33 and 34 actuated thereby in normal non-operated position, as shown in Figs. 1, 2 and 4.

Forming rollers 33 and 34 are securely held on spindles 23 and 24 by key members, such as 35, shown in Figs. 1 and 4.

The shaft 19 has its ends extending from each side of supporting members 10 and 11 and are each preferably of a square shaped cross-section for receiving a wrench 43 for actuating the gear mechanism.

In the operation of making a joint, the operating lever 43 and the rollers 33 and 34 are moved to the position as shown in Figs. 1 and 2 where they are held by the spring-pressed ball 32 engaging recess 30 in the gear 27. The sleeve S, for joining the ends of wires W—W, is fitted on the abutting wire ends and placed in position between the flat portions 41 and 42 of the forming rollers. The shaft 21 and the forming rollers are then rotated a complete turn through the movement of lever arm or wrench 43. In this tool the shaft 21 and rollers 33 and 34 may be provided with any number of grooves such as $a^1$—$a^3$, and $a^2$—$a^4$ in order to receive a number of sleeves of corresponding diameters.

What is claimed is:

1. In a rolling tool, an operating shaft, an actuating member therefor, a plurality of driven shafts, a gearing mechanism operatively connecting said shafts to said operating shaft, forming rollers carried by said shafts, a two-part casing for housing said mechanism and for supporting said shafts, said casing having cooperating portions arranged to form a handle for the tool.

2. In a rolling tool, a shaft, a countershaft, a gearing mechanism interconnecting said shaft to said countershaft an actuating member for said shaft, supporting members for said shaft and countershaft, said members cooperating to form a handle, and a device for resiliently retaining said actuating member in a predetermined position with respect to said handle.

3. In a rolling tool, a driving shaft, a gear carried by said shaft, a driven shaft having a gear engaging the first mentioned gear, a pair of coaxially disposed shafts, a gear carried by each of said shafts, a pinion carried by said driven shaft engaging the gears carried by said coaxially disposed shafts, cooperating forming rollers adjacent the ends of each of said driven shafts, means for rotating said driving shaft, and a two-part frame for supporting said shafts.

4. In a rolling tool, a driving shaft, a gear carried by said shaft, cooperating supporting members for said shaft, a driven shaft supported by each of said members and disposed in coaxial alignment one with respect to the other, another shaft supported by said members and having a gear engaging the first mentioned gear, a pinion carried by the last mentioned shaft, a gear carried by each of the coaxially disposed shafts and engaging said pinion, cooperating forming rollers carried by the second and last mentioned shafts, and means for actuating said driving shaft.

5. In a rolling tool, a driving shaft, means for rotating said shaft, a pair of driven shafts, gears connecting said driving shaft to said driven shafts, cooperating forming rollers carried by said driven shafts, a housing formed of two complementary portions having bearing surfaces therein for supporting each of said shafts and means on said housing for manually holding said tool during the operation of the first mentioned means.

6. In a rolling tool, a driving shaft, means for rotating said shaft, a plurality of driven shafts, gears connecting said driving shaft to said driven shafts, a detent associated with one of said gears for defining the angular movement of said shafts, cooperating forming rollers carried by said driven shafts, a housing formed of two complementary portions each having bearing surfaces therein for supporting each of said shafts and means on said housing for manually holding said tool during the operation of the first mentioned means.

7. In a rolling tool, a housing, a driving shaft mounted in said housing and having its end portions projecting therefrom, a lever for engaging either one of said portions, for actuating said shaft, a plurality of driven shafts having forming portions, said shafts being mounted in said housing, a gear mechanism operatively connecting said driving shaft to said shafts and a handle on said housing for holding said tool during the operation of said lever.

In witness whereof, we hereunto subscribe our names this 29th day of April, 1930.

WALTER S. HAYFORD.
CHARLES R. MOORE.